United States Patent
Raman

(10) Patent No.: US 11,631,286 B2
(45) Date of Patent: *Apr. 18, 2023

(54) FACILITATION OF SMART COMMUNICATIONS HUB TO SUPPORT REGISTERING, MONITORING, AND MANAGING A DRIVERLESS VEHICLE

(71) Applicant: AT&T Mobility II LLC, Atlanta, GA (US)

(72) Inventor: Kaveri Raman, Matawan, NJ (US)

(73) Assignee: AT&T MOBILITY II LLC, Atlanta, GA (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/228,397

(22) Filed: Apr. 12, 2021

(65) Prior Publication Data

US 2021/0241547 A1 Aug. 5, 2021

Related U.S. Application Data

(63) Continuation of application No. 16/905,164, filed on Jun. 18, 2020, now Pat. No. 11,004,278, which is a
(Continued)

(51) Int. Cl.
*G07C 5/00* (2006.01)
*B60T 7/16* (2006.01)
(Continued)

(52) U.S. Cl.
CPC ............ *G07C 5/008* (2013.01); *B60T 7/16* (2013.01); *B60T 8/885* (2013.01); *G06Q 40/08* (2013.01);
(Continued)

(58) Field of Classification Search
CPC . G07C 5/00; G07C 5/008; G07C 5/08; G07C 5/0808; G07C 5/0816;
(Continued)

(56) References Cited

U.S. PATENT DOCUMENTS 5,210,702 A * 5/1993 Bishop ............... G01N 21/3504
250/338.5
5,401,967 A * 3/1995 Stedman ................ G01N 21/33
356/438

(Continued)

FOREIGN PATENT DOCUMENTS

AU 2013344332 B2 5/2014
CN 109212514 A * 1/2019
(Continued)

OTHER PUBLICATIONS

Lei et al., "Operator Controlled Device-to-Device Communications in L TE-Advanced Networks," IEEE Wireless Communications, Jun. 2012, pp. 96-104, vol. 19, No. 3, IEEE, 9 pages.
(Continued)

Primary Examiner — Richard A Goldman
(74) Attorney, Agent, or Firm — Amin, Turocy & Watson, LLP

(57) ABSTRACT

A smart communications hub can enable management of driverless and/or autonomous vehicles. Separating current wireless data from driverless vehicle sensor data can allow for quicker resolutions involving driverless vehicles. The smart communications hub can communicate to other groups such as driverless vehicle providers, service providers, vehicle management, law enforcement, etc. The smart communications hub can also process request from both mobile applications and micro-service applications.

20 Claims, 12 Drawing Sheets

Related U.S. Application Data continuation of application No. 15/351,764, filed on Nov. 15, 2016, now Pat. No. 10,726,640.

(51) Int. Cl.
| | |
|---|---|
| *H04N 5/765* | (2006.01) |
| *H04N 5/77* | (2006.01) |
| *G06Q 40/08* | (2012.01) |
| *H04N 7/18* | (2006.01) |
| *B60T 8/88* | (2006.01) |
| *H04W 4/44* | (2018.01) |
| *H04L 67/12* | (2022.01) |
| *H04W 4/38* | (2018.01) |

(52) U.S. Cl.
CPC ............... *H04N 5/765* (2013.01); *H04N 5/77* (2013.01); *H04N 7/183* (2013.01); *H04W 4/44* (2018.02); *H04L 67/12* (2013.01); *H04W 4/38* (2018.02)

(58) Field of Classification Search
CPC .............. B60R 25/1004; B60R 25/102; B60R 2300/8073; B60T 7/16; B60T 8/885; G06Q 40/08; G08C 2101/32; G08C 2101/42; G08C 2101/51; G08B 25/016; G08B 25/00; G08B 25/002; G08B 25/009; H04L 67/12; H04L 29/08; H04N 5/765; H04N 5/77; H04N 7/183; H04W 4/44; H04W 4/38
USPC ........ 701/2, 23, 32.2; 340/425.5, 426.1, 463
See application file for complete search history.

(56) References Cited

U.S. PATENT DOCUMENTS

| | | | |
|---|---|---|---|
| 7,042,345 B2 * | 5/2006 | Ellis ..................... | G09B 21/006 340/436 |
| 7,527,339 B2 * | 5/2009 | Iizuka ................... | B60T 8/4872 303/9.62 |
| 8,344,864 B1 * | 1/2013 | Al-Mutawa ........... | B60W 50/14 340/435 |
| 8,421,864 B2 * | 4/2013 | Tano ..................... | G07C 5/008 348/148 |
| 8,521,352 B1 | 8/2013 | Ferguson et al. | |
| 8,527,199 B1 | 9/2013 | Burnette et al. | |
| 8,571,895 B1 * | 10/2013 | Medina, III ........... | G06Q 40/08 705/4 |
| 8,676,427 B1 | 3/2014 | Ferguson et al. | |
| 8,694,023 B2 | 4/2014 | Hu | |
| 8,849,494 B1 | 9/2014 | Herbach et al. | |
| 9,008,890 B1 | 4/2015 | Herbach et al. | |
| 9,176,500 B1 | 11/2015 | Teller et al. | |
| 9,187,088 B1 * | 11/2015 | Ferguson ............. | G05D 1/0088 |
| 9,282,447 B2 * | 3/2016 | Gianakis ............... | G08B 25/016 |
| 9,299,250 B1 * | 3/2016 | Sumcad ................ | G07C 5/008 |
| 9,373,149 B2 * | 6/2016 | Abhyanker ........... | G05D 1/0238 |
| 9,381,917 B1 * | 7/2016 | Dolgov ................. | G01S 17/931 |
| 9,418,489 B2 * | 8/2016 | Macdonald ........... | H04W 76/10 |
| 9,429,943 B2 * | 8/2016 | Wilson ................. | G05D 1/0246 |
| 9,607,449 B1 * | 3/2017 | Chen ..................... | G07C 5/008 |
| 10,726,640 B2 * | 7/2020 | Raman .................. | H04N 5/77 |
| 2002/0186144 A1 * | 12/2002 | Meunier ................ | G07B 15/00 340/901 |
| 2004/0104345 A1 * | 6/2004 | Kansakoski ........ | G01N 21/3504 250/338.5 |
| 2006/0255968 A1 * | 11/2006 | Woo ...................... | G07C 5/008 340/928 |
| 2008/0143497 A1 * | 6/2008 | Wasson ................. | G08G 1/205 340/425.5 |
| 2008/0236141 A1 * | 10/2008 | Peng ...................... | F01N 11/00 60/273 |
| 2009/0289782 A1 * | 11/2009 | Sonsterod ............. | B60R 25/1012 340/426.1 |
| 2010/0299466 A1 * | 11/2010 | Asano ................... | H04L 12/40039 710/105 |
| 2013/0190963 A1 * | 7/2013 | Kuss ..................... | B60L 3/0015 701/23 |
| 2013/0201316 A1 * | 8/2013 | Binder .................. | G07C 3/02 701/2 |
| 2014/0046505 A1 * | 2/2014 | Sakoda .................. | H04W 4/38 701/2 |
| 2014/0254896 A1 * | 9/2014 | Zhou ..................... | G06Q 20/40145 705/16 |
| 2015/0025708 A1 * | 1/2015 | Anderson ............. | A61B 5/02055 340/463 |
| 2015/0066284 A1 * | 3/2015 | Yopp .................... | H04W 76/50 701/29.2 |
| 2015/0134156 A1 * | 5/2015 | Henry ................... | G07C 5/0816 701/19 |
| 2015/0158486 A1 * | 6/2015 | Healey .................. | B60W 30/16 701/23 |
| 2015/0223273 A1 * | 8/2015 | Macdonald ........... | H04W 4/48 370/252 |
| 2015/0248131 A1 * | 9/2015 | Fairfield ............... | B60W 30/00 701/2 |
| 2015/0278759 A1 * | 10/2015 | Harris .................. | G06Q 10/08355 705/338 |
| 2015/0309512 A1 * | 10/2015 | Cudak .................. | G08G 1/0112 701/23 |
| 2015/0339928 A1 * | 11/2015 | Ramanujam .......... | G08G 1/202 701/23 |
| 2016/0021178 A1 * | 1/2016 | Liu ....................... | H04L 41/06 370/216 |
| 2016/0070262 A1 * | 3/2016 | Kawash ................ | A63G 25/00 701/2 |
| 2016/0080539 A1 * | 3/2016 | Limbaugh ............. | G05D 1/0022 455/66.1 |
| 2016/0116293 A1 * | 4/2016 | Grover ................. | G08G 1/005 701/23 |
| 2016/0125735 A1 * | 5/2016 | Tuukkanen ............ | H04L 67/12 701/23 |
| 2016/0129908 A1 * | 5/2016 | Harda .................. | B60W 30/146 701/24 |
| 2016/0203656 A1 * | 7/2016 | Bhogal ................. | G07C 5/0808 701/32.2 |
| 2016/0260328 A1 * | 9/2016 | Mishra ................. | G01S 13/931 |
| 2017/0276495 A1 * | 9/2017 | Krishnan ............. | G08G 1/096741 |
| 2017/0337805 A1 * | 11/2017 | Eyring .................. | G08B 13/1968 |
| 2018/0041942 A1 * | 2/2018 | Raman .................. | H04W 12/08 |
| 2018/0054851 A1 * | 2/2018 | Condeixa ............. | H04W 88/04 |
| 2018/0108189 A1 * | 4/2018 | Park ...................... | G07C 5/008 |
| 2018/0137693 A1 * | 5/2018 | Raman .................. | B60T 7/16 |
| 2018/0276351 A1 * | 9/2018 | Patton .................. | G06F 21/6218 |

FOREIGN PATENT DOCUMENTS

| | | | | |
|---|---|---|---|---|
| CN | 109686109 A | * | 4/2019 | .......... G08G 1/0175 |
| EP | 1519314 A1 | * | 3/2005 | .......... G06T 7/0002 |
| EP | 2343504 A1 | | 7/2011 | |
| EP | 3033862 A1 | | 6/2016 | |
| JP | 2001014571 A | * | 1/2001 | |
| JP | 2013122624 A | * | 6/2013 | |
| WO | 2016049923 A1 | | 4/2016 | |

OTHER PUBLICATIONS

Seif et al., "Autonomous Driving in the iCity—HD Maps as a Key Challenge of the Automotive Industry," Engineering 2, 2016, pp. 159-162, Elsevier LTD, 4 pages.
Ghavimi et al., "M2M Communications in 3GPP LTEILTE-A Networks: Architectures, Service Requirements, Challenges, and Applications," IEEE Communications Surveys & Tutorials, 2015, pp. 525-549, vol. 17, No. 2, IEEE, 25 pages.
Altintas et al., "Making Cars a Main ICT Resource in Smart Cities," 2015, IEEE Conference on ComputerCommunications Workshops, The First International Workshop on Smart Cities and Urban Informatics, pp. 654-659, IEEE, 6 pages.

(56) References Cited

OTHER PUBLICATIONS

Dressler et al., "Inter-Vehicle Communication—Quo Vadis," IEEE Communications Magazine, 2014, pp. 170-177, vol. 52, No. 6, IEEE, 10 pages.
Ross, "Self-Driving Cars Face Serious Roadblocks, Experts Say," IEEE Spectrum, Sep. 10, 2014, 3 pages.
Payne, William. "US commits $4 billion to driverless car pilots." M2M Zone, Jan. 20, 2016. 2 pages.
Greenblatt, Nathan A. "Self-Driving Cars Will Be Ready Before Our Laws Are: Putting autonomous vehicles on the road isn't just a matter of fine-tuning the technology." IEEE Spectrum, Jan. 19, 2016. 4 pages.
Karmel, Anil, et al. "NIST Definition of Microservices, Application Containers and System Virtual Machines." NIST, National Institute of Standards and Technology . Feb. 2016. 12 pages.
Boucadair, Mohamed. "Handbook of Research on Redesigning the Future of Internet Architectures." IGI Global, 2015. 1 page.
Non-Final Office Action received for U.S. Appl. No. 15/351,764 dated Sep. 21, 2018, 31 pages.
Final Office Action received for U.S. Appl. No. 15/351,764 dated Mar. 12, 2019, 24 pages.
Non-Final Office Action received for U.S. Appl. No. 15/351,764 dated Jul. 2, 2019, 27 pages.
Final Office Action received for U.S. Appl. No. 15/351,764 dated Dec. 6, 2019, 43 pages.
Office Action dated Oct. 2, 2020 for U.S. Appl. No. 16/905,164, 60 pages.
U.S. Appl. Nos. 16/905,164 and 15/351,764, filed Jun. 18, 2020 and Nov. 15, 2016.

\* cited by examiner

FACILITATION OF SMART COMMUNICATIONS HUB TO SUPPORT REGISTERING, MONITORING, AND MANAGING A DRIVERLESS VEHICLE

RELATED APPLICATIONS

The subject patent application is a continuation of, and claims priority to each of, U.S. patent application Ser. No. 16/905,164, filed Jun. 18, 2020, and entitled "FACILITATION OF SMART COMMUNICATIONS HUB TO SUPPORT DRIVERLESS VEHICLES IN 5G NETWORKS OR OTHER NEXT GENERATION NETWORKS," which is a continuation of U.S. patent application Ser. No. 15/351,764 (now U.S. Pat. No. 10,726,640), filed Nov. 15, 2016, and entitled "FACILITATION OF SMART COMMUNICATIONS HUB TO SUPPORT DRIVERLESS VEHICLES IN 5G NETWORKS OR OTHER NEXT GENERATION NETWORKS," the entireties of which applications are hereby incorporated by reference herein.

TECHNICAL FIELD

This disclosure relates generally to facilitating a smart communications hub for 5G networks or other next generation networks. For example, this disclosure relates to supporting driverless vehicles in a 5G radio access network.

BACKGROUND

5th generation (5G) wireless systems represent the next major phase of mobile telecommunications standards beyond the current telecommunications standards of $4^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

The above-described background relating to facilitating a smart communications hub is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
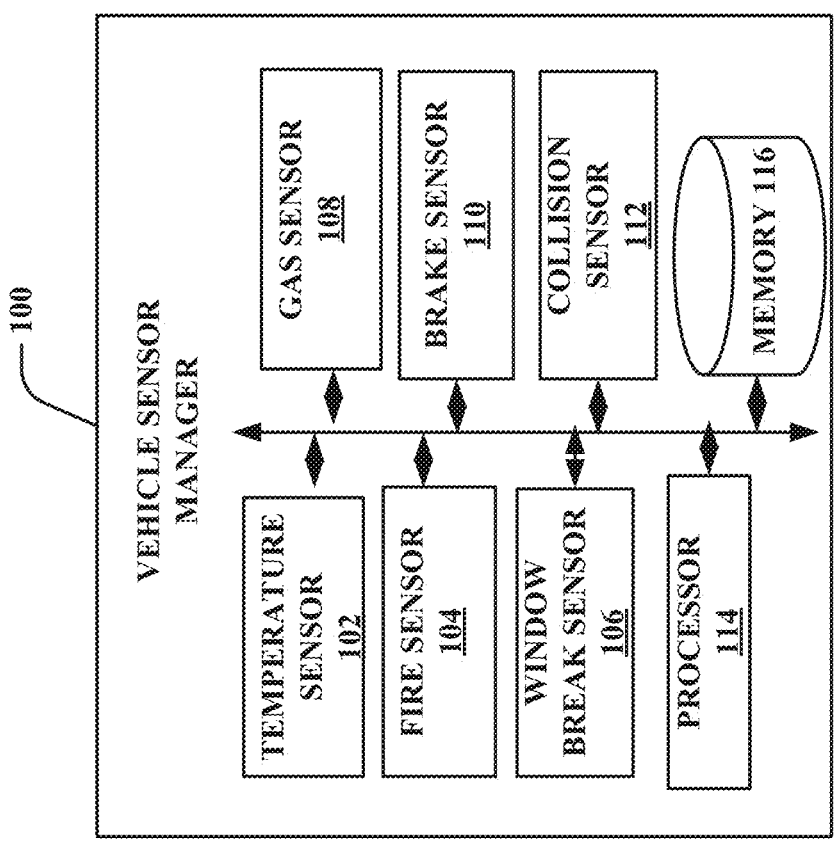
FIG. 1 illustrates an example schematic system block diagram of vehicle sensor components according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a smart communications hub for driverless vehicles in 5G networks or other next generation networks.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate a physical layer design for a 5G network. Facilitating a physical layer design for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)).

Cloud radio access networks (RAN) can enable the implementation of concepts such as software defined network (SDN) and network function virtualization (NFV) in 5G networks. This disclosure can facilitate implementation of 5G radio access network (RAN) based on a centralized/virtualized RAN architecture. 5G radio access networks are expected to be deployed with massive multiple-input and multiple-output (MIMO) antenna systems using a large number of antennas. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

A smart communications hub can communicate with various entities and/or groups such as driverless vehicle providers, service providers, insurance providers, vehicle management, smart cities and law enforcement. The smart communications hub can process requests from both mobile applications and micro-service applications to manage driverless and/or autonomous vehicles. It should be noted that Internet of things (IoT) sensor data generated by driverless vehicles can be separate from device data generated by human beings. Therefore, the smart communications hub can support this separation of data.

Micro-services for vehicles can comprise firmware updates, direct a vehicle to a vehicle service center, etc. A micro-service is a basic element that results from the architectural decomposition of an application's components into loosely coupled patterns consisting of self-contained services that communicate with each other using a standard communications protocol and a set of well-defined APIs, independent of any vendor, product or technology. A new network element called a driverless-LTE-machine-type communication (MTC) gateway (D-LTE-MTC) can integrate with smaller capillary networks (e.g., LTE packet data network) (sensor/device data) on the autonomous or driverless vehicle into a wide area network (WAN). Another network element called driverless evolved node B (DeNB) can support sensor data from driverless or autonomous vehicles on the access network. The DeNB can receive sensor data from driverless cars and pass it to a driverless autonomous gateway (DGW). The DGW element can reside in a wireless mobility network and communicate with a serving gateway (SGW) and route to the smart communications hub data for driverless vehicles via a multi-protocol label switching (MPLS) and/or a virtual private network (AVPN) connection. The DGW can aggregate traffic from a large number of DeNBs. A new set of micro-services to support driverless vehicles can be made available to users to manage firmware updates in driverless cars. The proposed smart communications hub can support micro-services that relate to driverless cars. It should be understood that the three proposed network elements can also be implemented as a separate network element or software defined network element.

Mobile applications can support the ordering, servicing, and insurance needs of driverless vehicles. For example, a user can order a driverless car, via a mobile application, the same way that the user would order an Uber® ride. When the data reaches the core network, the data can be passed using either Internet protocol security (IPSec) communications and/or MPLS to feed into the smart communications hub. The smart communications hub can receive requests from humans to "order", "cancel", "service" and "insure" driverless vehicles. Additionally, the smart communications hub can process micro-services applications that update firmware in the driverless vehicles by interfacing to the needed service providers. Therefore, the smart communications hub can serve both humans and the autonomous vehicles efficiently. The smart communications hub can also provide a portal to other areas such as the driverless car providers, insurance companies, service companies, vehicle management, and law enforcement agencies. Furthermore, the smart communications hub can interface with a smart cities framework.

The smart communications hub can comprise a two-way interface to receive requests from humans or driverless vehicles and to return data back to the humans or driverless vehicles as needed. The smart communications hub can also interface with third parties—such as driverless vehicle providers, third party providers who update the firmware of the driverless vehicles, service providers, driverless vehicle registration, management portals, and any other needed entities. For purposes of this disclosure, it should be understood that a driverless vehicle does not mean that the vehicle is incapable of being driven, rather it means that the vehicle has the capabilities to drive itself, without human intervention even if human intervention is actually possible.

The smart communications hub can support both mobile applications and micro-services (e.g., an update to brake sensor, an update to a gas sensor, an update comprising a temporary deactivation of a sensor, etc.). The smart communications hub can also communicate with smart cities by providing a feedback into the infrastructure of the smart cities where citizens can access data related to the smart city. For instance, the smart city can communicate with a driverless vehicle, via the smart communications hub, to indicate that a specific geographical location is congested with traffic. Additionally, city officials can send alerts to the self-driving vehicles, which can divert the vehicles away from the areas of congestion.

In one embodiment, described herein is a method comprising receiving sensor data representative of a sensor state of a sensor of a vehicle. Based on receiving the sensor data, the method can send the sensor data to a second network device associated with a second identity. In response to the sending, the method can receive, from the second network device by the first network device, action data representative of an action to be taken by the sensor Furthermore, the method can comprise sending by the first network device, the action data to the sensor to facilitate performance of the action by the sensor.

According to another embodiment, a system can facilitate, a system can receive sensor data associated a sensor of a vehicle and in response to the receiving, send the sensor data to a network device associated with a first entity. Additionally, in response to the sending, the system can receive from the network device, first notification data, representative of a first notification to the vehicle, and second notification data representative of a second notification to a second entity. Consequently, the system can send the first notification data to the vehicle and, the system can send the second notification data to the second entity.

According to yet another embodiment, described herein is a machine-readable storage medium that can perform the operations comprising receiving sensor data associated with a sensor of a vehicle. Based on the sensor data, the machine-readable medium can receive action data representative of an action to be taken by the vehicle, from a network device. Thus, action data can be sent to the vehicle to facilitate the action, and in response to the sending the action data, the machine-readable medium can send confirmation data, representative of a confirmation that the vehicle has received the action data, to the network device.

These and other embodiments or implementations are described in more detail below with reference to the drawings.

Referring now to FIG. 1, illustrated is an example schematic system block diagram of vehicle sensor components according to one or more embodiments. Vehicles capable of using the smart communications hub 200 can comprise a vehicle sensor manager 100 capable of managing vehicle sensors of the vehicle. The vehicle sensor manager 100 can comprise various vehicle sensors including, but not limited to, temperature sensors 102, gas sensors 108, fire sensors 104, brake sensors 110, window break sensors 106, collision sensors 112, etc. Furthermore, the vehicle sensor manager 100 can comprise a processor 114 for controlling operations and functions of the sensors and a memory 116 for storing sensor-based data. The vehicle sensor manager 100 can receive vehicle sensor data and/or transmit the vehicle sensor data. It should be noted that each sensor can also be capable of receiving and transmitting sensor data.

The sensors can be configured to sense states of the vehicle and/or surrounding the surrounding environment. For instance, the temperature sensor 102 can be configured to detect the ambient temperature of the vehicle, a cabin temperature of a vehicle, and/or an engine or motor temperature of the vehicle. The fire sensor 104 can be configured to detect a fire associated with the vehicle and/or sense an impending fire. For example, if the engine or electronics of the vehicle are reaching a critical temperature, the fire sensor 104 can provide an indication to the vehicle sensor manager, and/or the smart communications hub 200.

The window break sensor 106 can be configured to determine a window break of the vehicle. For example, if a thief has broken into the vehicle or if the vehicle has been in an accident causing the window to break, the window break sensor 106 can be triggered. Additionally, the vehicle sensor manager can comprise a gas sensor 108 to determine a gas level and/or initiate some type of precautionary action. For instance, if the vehicle has been in an accident and the fire sensor 104 is tripped, the gas sensor 108 can provide data to shut off gas flow and/or restrict gas flow so as not to contain the gas from the fire. The brake sensor 110 can configured to provide an indication of braking, brake power, failure to break, etc. This data can be useful in determining fault during an accident and/or insurance rates of a particular vehicle and its safety. Furthermore, the collision sensor 112 can be configured to anticipate a collision, detect a collision, and/or determine the type of collision. For instance, the collision sensor 112 should be able to decipher between running over a rodent and running over a pedestrian, thereby allowing the vehicle to react accordingly. It should also be understood that the sensors can be communicatively coupled to each other to provide additional data to the vehicle and/or the smart communications network. For instance, anticipatory data received by the collision sensor 112 can be used to apply a brake of the vehicle, thereby activating the brake sensor 110 or vice versa.

Figure 2:
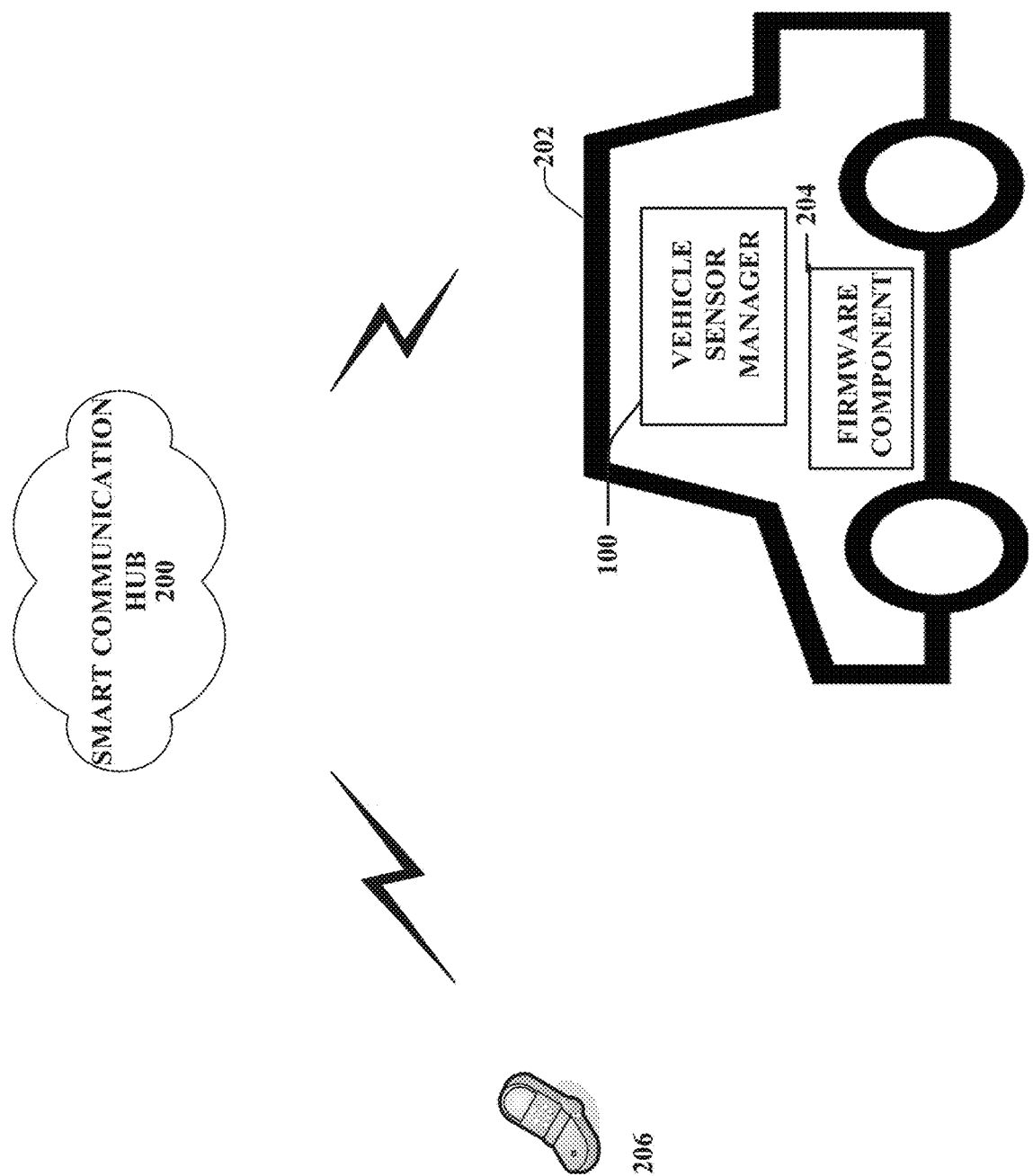
FIG. 2 illustrates an example schematic system block diagram of a communication hub associated with a vehicle according to one or more embodiments.

Referring now to FIG. 2, illustrated is an example schematic system block diagram of a communication hub associated with a vehicle according to one or more embodiments. The smart communications hub 200 can facilitate communications between a mobile device 206 and a driverless vehicle 202. For instance a user can request a driverless vehicle to come to their location via a mobile application that can allow send the request data to the smart communication hub 200. The smart communication hub 200 can then forward the request data to the driverless vehicle 202 to fulfill the request. The smart communication hub 200 can also receive a response from the driverless vehicle 202 and forward the response to the mobile device 206. For instance, the response might indicate to the user that the request has been process and a driverless vehicle is on the way. Additionally, the smart communication hub 200 can send firmware to a firmware component 204 of the driverless vehicle 202. The firmware can comprise data to allow the driverless vehicle 202 to efficiently fulfill its duty such as navigation data associated with the user's location, updates to a geographic topography, traffic, weather alerts, etc.

Figure 3:
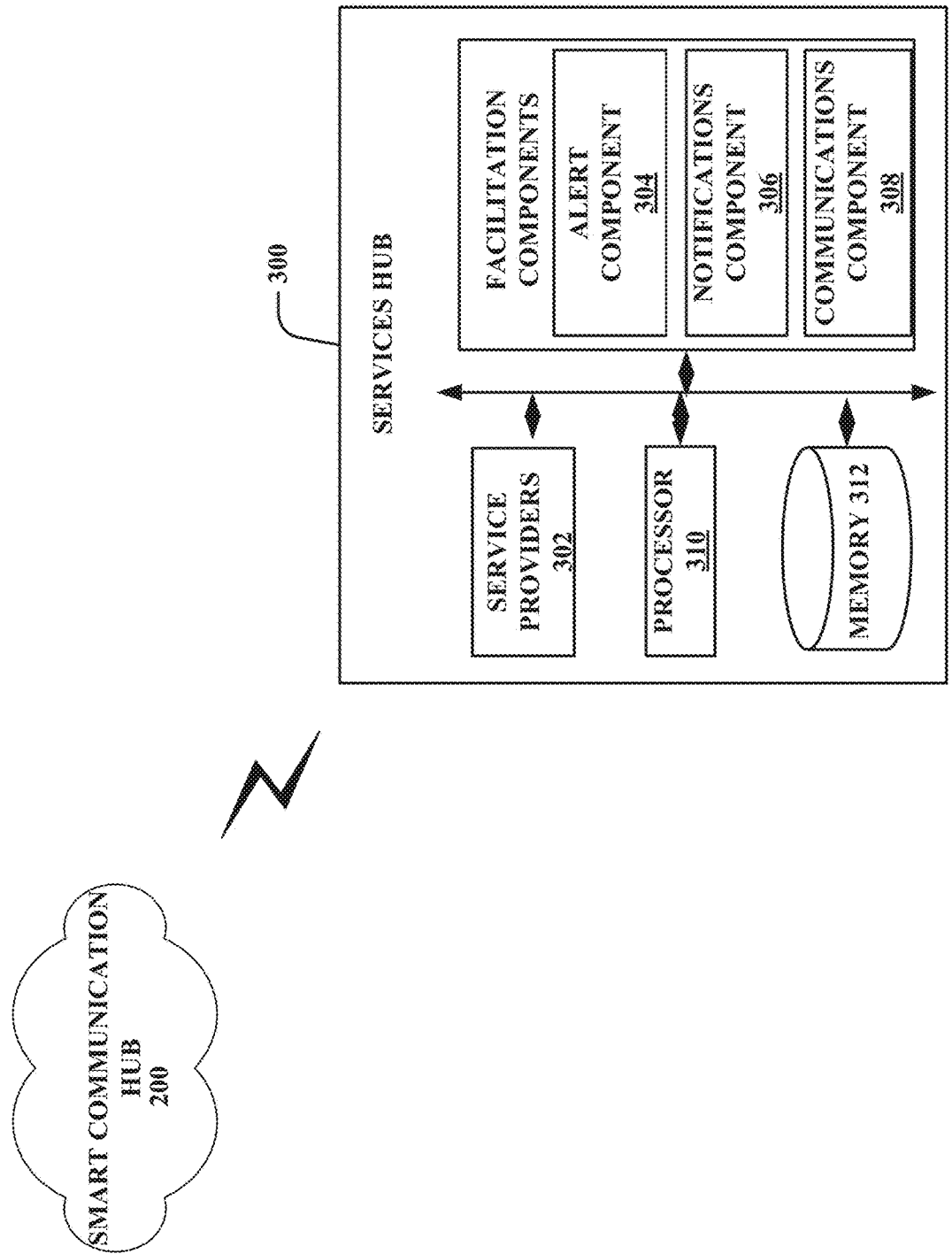
FIG. 3 illustrates an example schematic system block diagram of a communication hub in communication with a services hub according to one or more embodiments.

Referring now to FIG. 3, illustrated is an example schematic system block diagram of a communication hub in communication with a services hub according to one or more embodiments. The smart communication hub 200 can also communicate with a services hub 300. The services hub 300 can interact with service providers 304 and facilitate alerts via an alert component 304, notifications via a notification component 306, and communications via a communications component 308. Furthermore, the services hub can comprise a processor 310 for controlling operations and functions of the services hub 300 and a memory 312 for storing services of the services hub 300.

The driverless vehicle 202 can leverage several service providers 304 to provide services to the driverless vehicle 202 itself and/or a user of the driverless vehicle. For instance, service providers 304 can provide data to the driverless vehicle 202 to assist in performing any services necessary to fulfill a need of a user. For instance, a microservice might comprise a global positioning system of the driverless vehicle 202 to help route the driverless vehicle 202 to a specific destination. The service providers can communicate with the driverless vehicle 202 via the smart communication hub 200. For instance, the service provider 304 can send a firmware update via the smart communication hub 200 to the driverless vehicle 202 and/or the mobile device 206 of the user.

The facilitation components can process acquisition and retrieval of the driverless vehicle 202. For instance, the notifications component 306 can notify the mobile device 206 user that a driverless vehicle 202 has been commissioned to fulfill the request of the mobile device 206. Furthermore, the notifications component 306 can provide a notification to the driverless vehicle 202 that it has been commissioned by the user to facilitate a request of the user. The alert component 304 can generate alerts associated with the transaction (e.g., navigation alerts, weather alerts, time alerts, traffic alerts, maintenance alerts, etc.). For instance, after the driverless vehicle 202 has been commissioned, the notification component 306 can provide an alert to the user indicating that the vehicle will arrive five minutes late due to weather conditions. The various alerts and notifications can be sent via the communications component 308. The communications component 308 can also be configured to receive the request for the driverless vehicle 202 from the via the communications hub 208.

Figure 4:
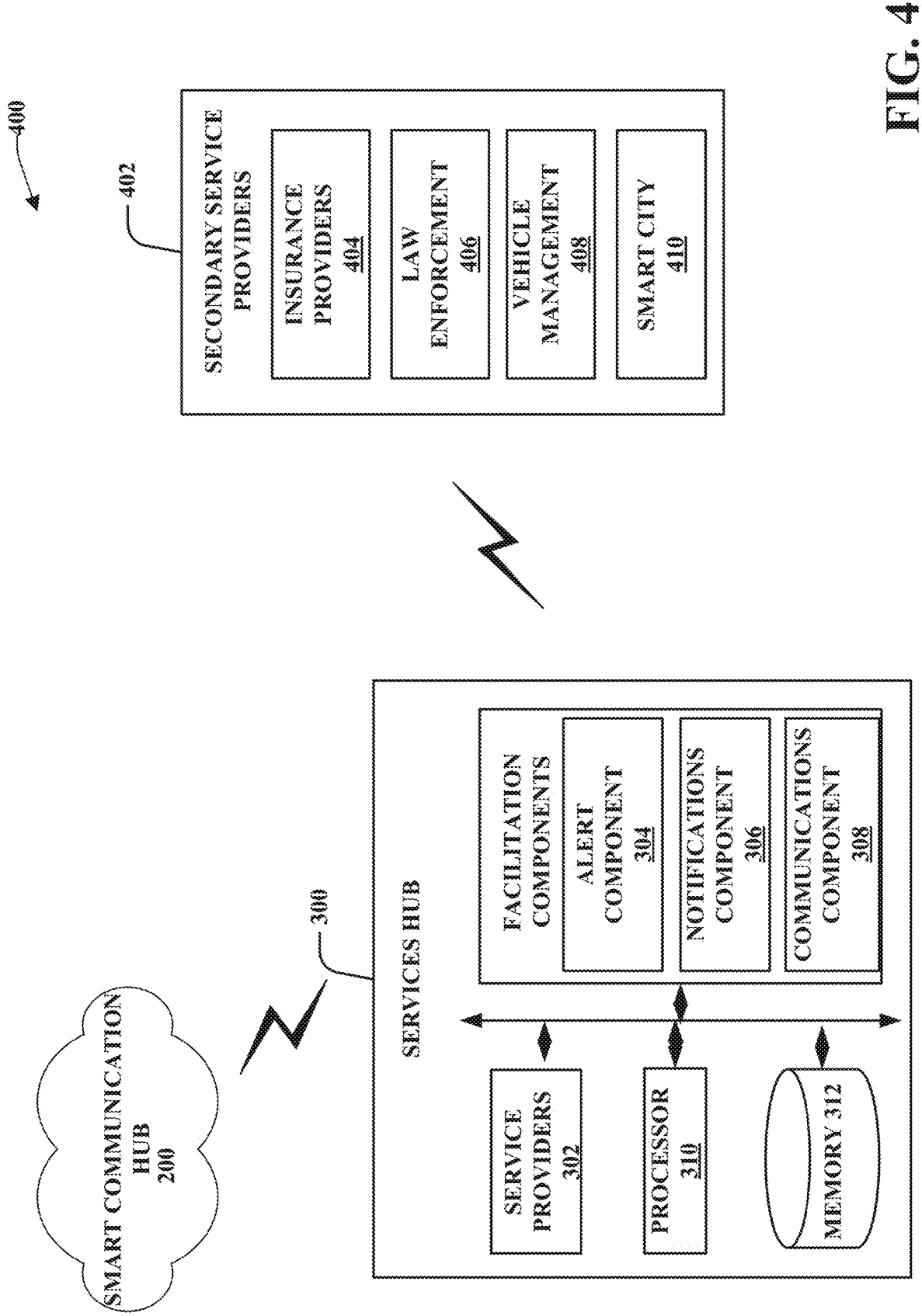
FIG. 4 illustrates an example schematic system block diagram of a communication hub in communication with a services hub in communication with a tertiary service provider according to one or more embodiments.

Referring now to FIG. 4, illustrated is an example schematic system block diagram of a communication hub in communication with a services hub in communication with a tertiary service provider according to one or more embodiments. In an alternate embodiment, the communication component 308 can also communicate with secondary service providers 402, which are separate from the services hub 300 service providers 302. The secondary service providers 402 can provide governmental services. These service providers can comprise insurance providers 404, law enforcement 406, vehicle management 408, and smart cities 410. The secondary service providers 402 can ensure that the driverless vehicles 202 are in compliance with certain legal and governmental mandates. For instance, the insurance provider 404 can decommission a driverless vehicle 202 if it is determined to not have insurance. In one embodiment the insurance provider 404 can decommission the driverless vehicle 202 itself. However, in an alternate embodiment, the insurance provider 404 can request that the smart communications hub 200 decommission the driverless vehicle 202.

Law enforcement 406 can also decommission the driverless vehicle 202 if it is determined that an occupant of the driverless vehicle 202 has broken the law. Alternatively, the law enforcement can request that the smart communications hub 200 decommission the driverless vehicle 202 in response to a law being determined to have been broken. Conversely, law enforcement 406 can communicate with the services hub 300 or the driverless vehicle 202 directly in case of an emergency. For instance, if there is a high-speed chase taking place on a northbound interstate, the law enforcement 406 can initiate an emergency directive for all driverless vehicles 202 to pull to the shoulder of the interstate to avoid an accident as the chase ensues.

The vehicle management 408 of the secondary service providers 402 can serve ancillary functions such as driverless vehicle 202 registration, occupancy, compliance, etc. For example today vehicles must pass an emissions test prior to registration being allowed. This requires the user to take time out of his/her day to have their vehicle tested at an emissions testing facility. However, the driverless vehicle 202 can self-report driverless vehicle 202 data to the vehicle management 408 provider, thereby alleviating the cumbersome registration process that vehicle owners currently endure. For instance, at a predetermined time and/or randomly, the driverless vehicle can determine an emissions status via an emissions sensors and send this emission data to the smart communication hub 200, which can then send the emissions data to the communications component 308 of the services hub 300 to be sent to the vehicle management 408 secondary service provider 402. The vehicle management 408 secondary service provider 402 can then issue the driverless vehicle's 202 registration in response to the emissions data being within a certain tolerance. Alternatively, the vehicle management 408 secondary service provider 402 can request emissions data, at any given time, via the aforementioned process in reverse. It should be noted that regular emissions updates can be stored in the services hub 300 memory 312, which can then be pulled by the vehicle management 408 secondary service provider 402 at a time of its choosing.

The secondary service providers 402 can also comprise smart cities 410. Smart cities 410 have the ability to interact and communicate with the driverless vehicles 202. For instance, smart cities 410 can generate impromptu detours for driverless cars 202 and non-driverless cars in certain scenarios. Based on traffic and a city grid, the smart city 410 can determine how many driverless cars 202 to send on one route versus another route to minimize the effects of traffic. The smart city can then send this data to the smart communication hub 200, and the smart communication hub 200 can direct the driverless vehicles 202 accordingly. The smart city can also leverage video cameras to help create an overall picture of a moment in time. For example, if a burglar breaks the window of a driverless vehicle 202, the window break sensor 106 can be tripped. In response to the window break sensor 106 being tripped, window break sensor 106 data can be sent to the smart communication hub 200 and then sent to the smart city 410. In addition to driverless vehicle 202 cameras being activated, smart city 410 cameras can be activated and/or zoom in to get a clearer picture/video of the burglar.

Figure 5:
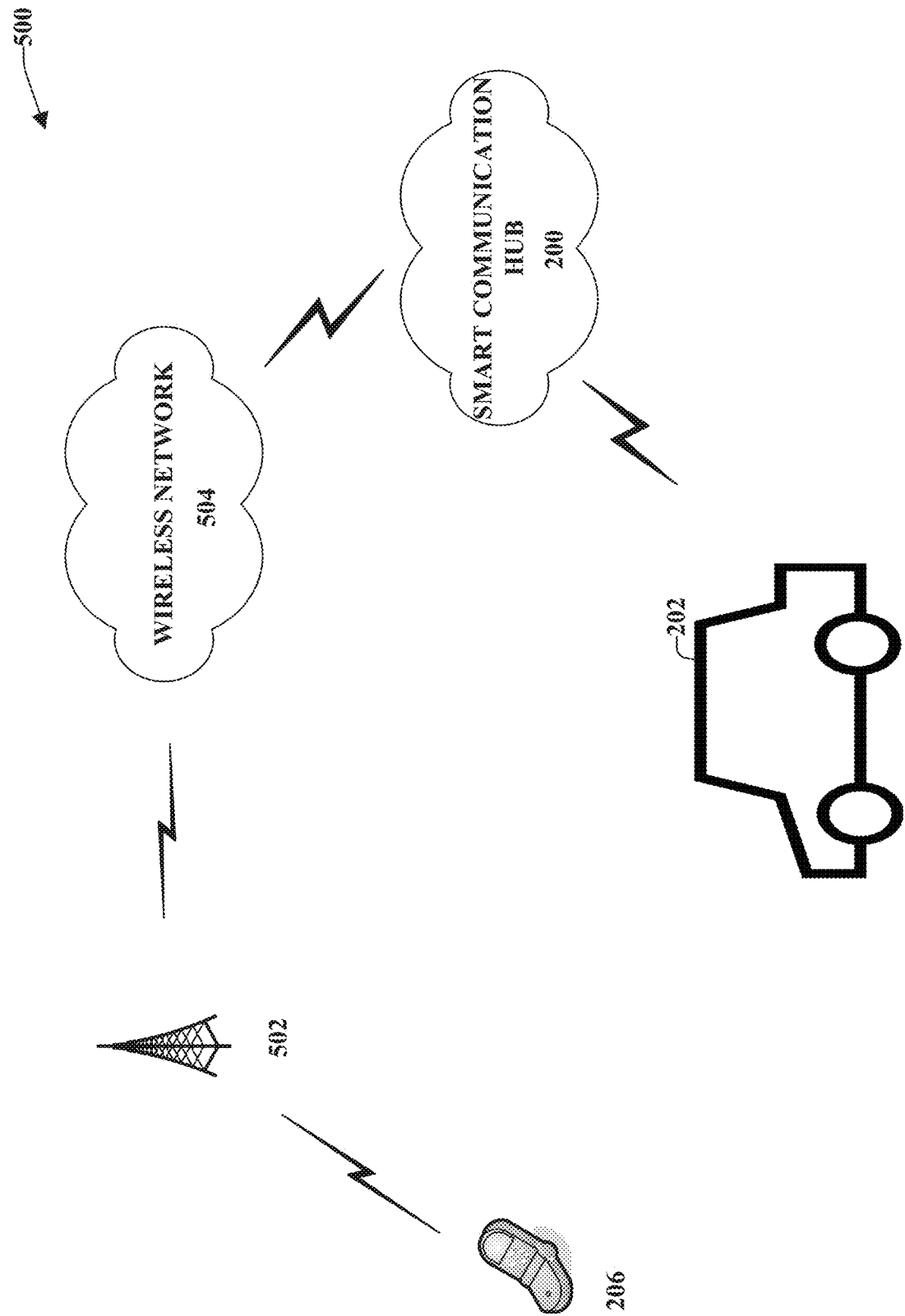
FIG. 5 illustrates an example schematic system block diagram of a wireless network in communication with a communication hub according to one or more embodiments.

Referring now to FIG. 5, illustrated is an example schematic system block diagram of a wireless network in communication with a communication hub according to one or more embodiments. In one embodiment, the mobile device 206 can send request data, to request a driverless vehicle 202. The request data can be sent to a wireless network 504 via an eNodeB 502. The wireless network 504 can comprise a home subscriber server (HSS), a mobility management entity (MME), a serving gateway (SGW), a packet data network gateway (PGW), and a policy charging and rules function (PCRF). The request data can then be sent to the smart communication hub 200. The smart communication hub 200 can then direct the driverless vehicle 202, over the wireless network 504, to the location indicated by the mobile device 206. In this embodiment, the system can use the same wireless network 504 to send wireless device data and driverless vehicle 202 data. However, as discussed later with reference to FIG. 6, the driverless vehicle 202 system can leverage a completely different wireless network for data reception and transmission.

Figure 6:
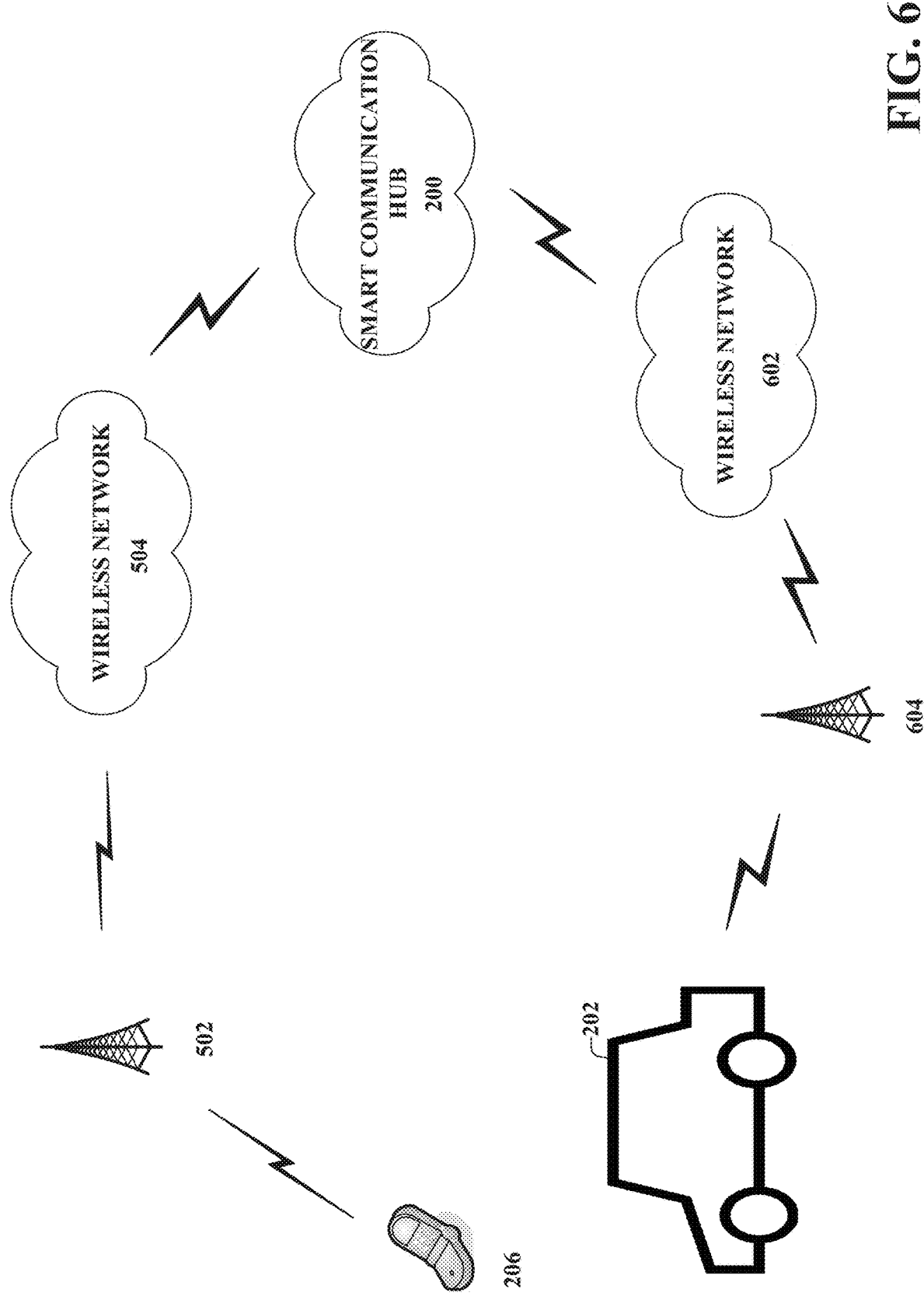
FIG. 6 illustrates an example schematic system block diagram of two wireless networks in communication with a communication hub according to one or more embodiments.

Referring now to FIG. 6, illustrated is an example schematic system block diagram of two wireless networks in communication with a communication hub according to one or more embodiments. In an alternate embodiment, the mobile device 206 can send request data, to request a driverless vehicle 202. The request data can be sent to a wireless network 504 via an eNodeB 502. The wireless network 504 can comprise a home subscriber server (HSS), a mobility management entity (MME), a serving gateway (SGW), a packet data network gateway (PGW), and a policy charging and rules function (PCRF). The request data can then be sent to the smart communication hub 200. The smart communication hub 200 can then convert the request data into LTE-MTC data to be sent over another wireless network 602, wherein the other wireless network 602 is dedicated to driverless vehicles 202. The other wireless network 602 can comprise the same functionality as the wireless network 504 (e.g., MME, SGW, PGW, PCRF), however the other wireless network 602 can also comprise a driverless autonomous gateway (DGW). The DGW can communicate the request data to a driverless evolved node B (DeNB) for LTE-MTC data, which can then direct the driverless vehicle 202 to the location indicated by the mobile device 206. In this embodiment, the system can same wireless network 504 to send wireless device data and driverless vehicle 202 data.

Figure 7:
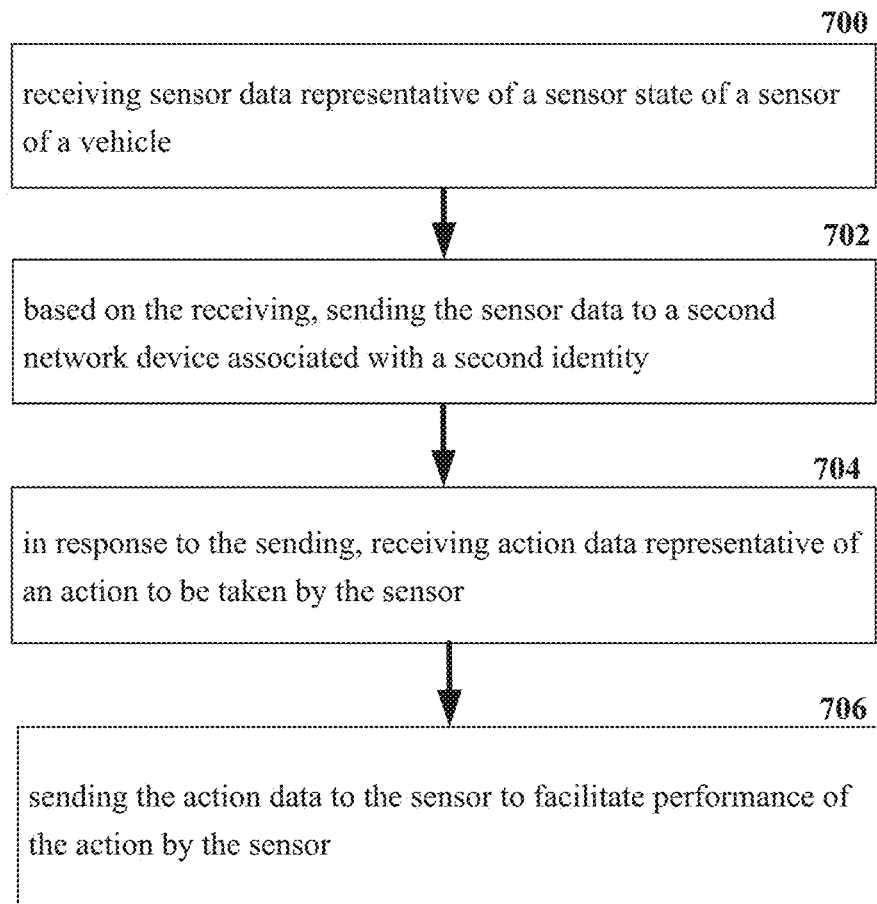
FIG. 7 illustrates an example flow diagram for sending action data to a vehicle sensor according to one or more embodiments.

Referring now to FIG. 7, illustrated is an example flow diagram for sending action data to a vehicle sensor according to one or more embodiments. At element 700, a network device associated with a first user identity can receive sensor data representative of a sensor state of a sensor of a vehicle (e.g., via the smart communication hub 200). Based on receiving the sensor data, sending (e.g., via the vehicle sensor manager 100) at element 704, the sensor data to a second network device associated with a second identity. In response to the sending, receiving, at element 706, from the second network device by the first network device, action data representative of an action to be taken by the sensor (e.g., via the smart communication hub 200). Furthermore, sending (e.g., via the vehicle sensor manager 100), by the first network device, the action data to the sensor to facilitate performance of the action by the sensor at element 708.

Figure 8:
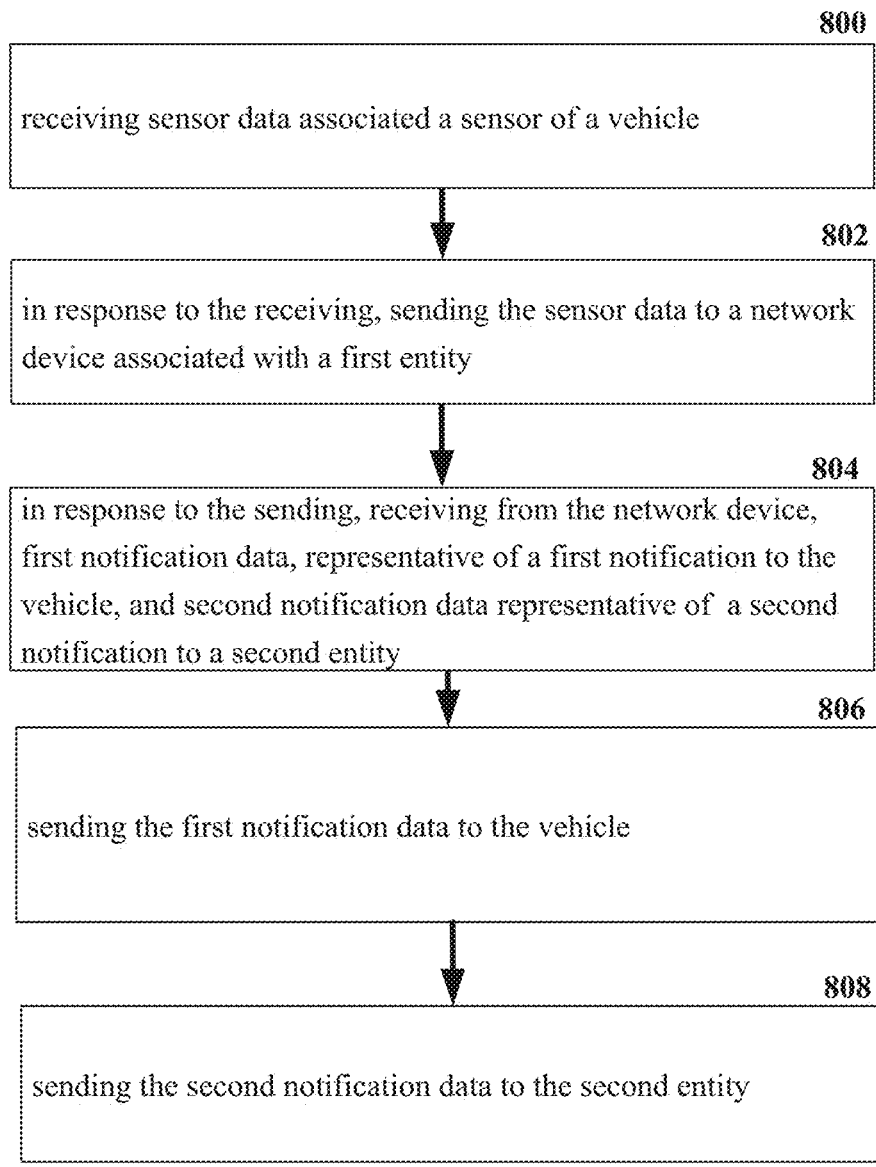
FIG. 8 illustrates an example flow diagram for sending notification data to an entity associated with a vehicle according to one or more embodiments.

Referring now to FIG. 8, illustrated is an example flow diagram for sending notification data to an entity associated with a vehicle according to one or more embodiments. At element 800, the system can receive sensor data associated a sensor of a vehicle (e.g., via the vehicle sensor manager 100). Furthermore, in response to the receiving, sending (e.g., via the communications component 308) the sensor data to a network device associated with a first entity at element 802. Additionally, in response to the sending, receiving from the network device (e.g., via the communications component 308), first notification data, representative of a first notification to the vehicle, and second notification data representative of a second notification to a second entity at element 804. Consequently, at element 806, the system can send (e.g., via the smart communication hub 200) the first notification data to the vehicle and at element 808, the system can send (e.g., via the smart communication hub 200) the second notification data to the second entity.

Figure 9:
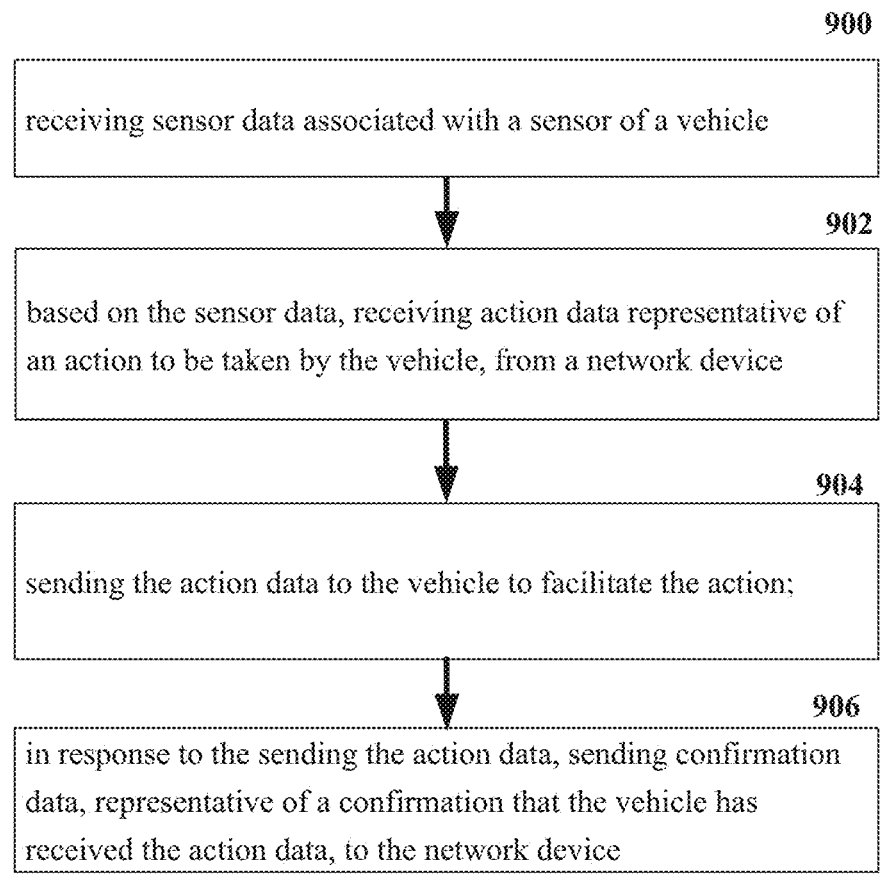
FIG. 9 illustrates an example flow diagram for sending action data and confirmation data according to one or more embodiments.

Referring now to FIG. 9, illustrated is an example flow diagram for sending action data and confirmation data according to one or more embodiments. At element 900, a machine-readable medium can receive (e.g., via the smart communication hub 200) sensor data associated with a sensor of a vehicle. Based on the sensor data, the machine-readable medium can receive (e.g., via the smart communication hub 200) action data representative of an action to be taken by the vehicle, from a network device (e.g., via the services hub 300) at element 902. At element 904, action data can be sent to the vehicle to facilitate the action (e.g., via the smart communication hub 200), and in response to the sending the action data, confirmation data can be sent (e.g., via the smart communication hub 200) at element 906, representative of a confirmation that the vehicle has received the action data, to the network device (e.g., via the services hub 300).

Figure 10:
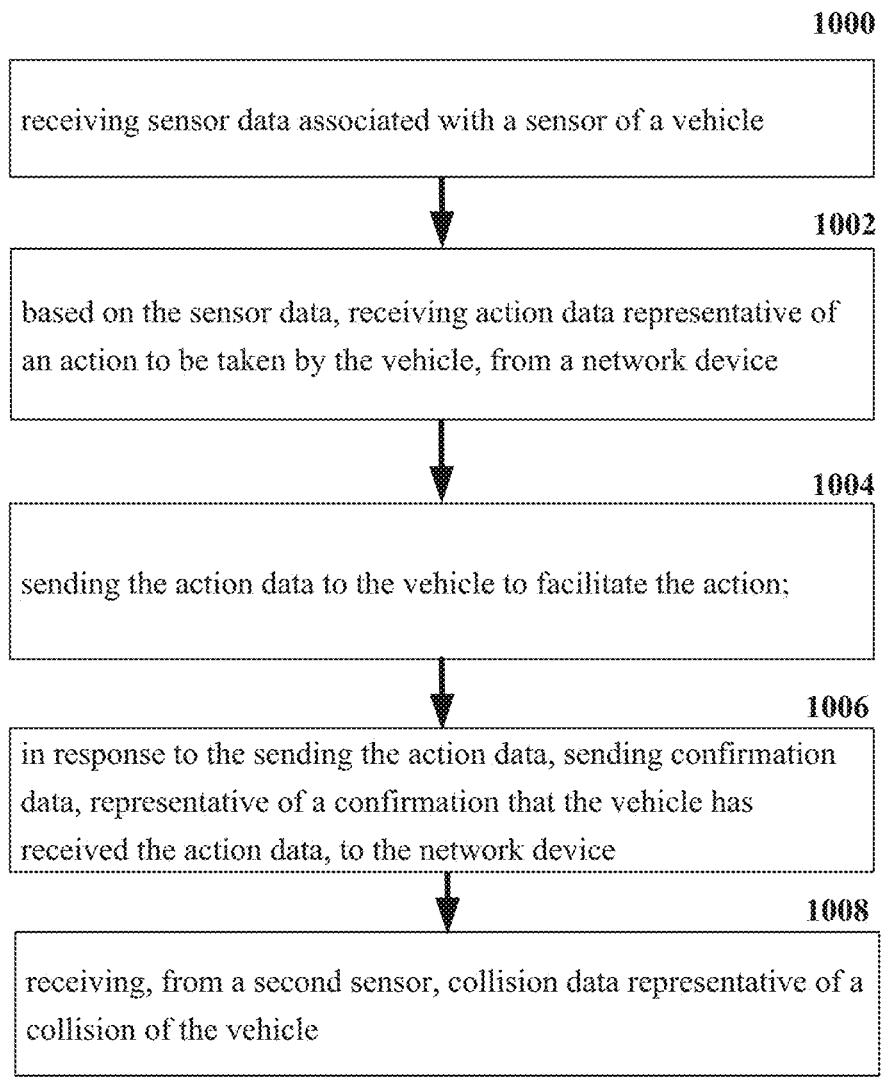
FIG. 10 illustrates an example flow diagram for sending action data and confirmation data and receiving collision data according to one or more embodiments.

Referring now to FIG. 10, illustrated is an example flow diagram for sending action data and confirmation data and receiving collision data according to one or more embodiments. At element 1000, a machine-readable medium can receive (e.g., via the smart communication hub 200) sensor data associated with a sensor of a vehicle. Based on the sensor data, the machine-readable medium can receive (e.g., via the smart communication hub 200) action data representative of an action to be taken by the vehicle, from a network device (e.g., via the services hub 300) at element 1002. At element 1004, action data can be sent to the vehicle to facilitate the action (e.g., via the smart communication hub 200), and in response to the sending the action data, confirmation data can be sent (e.g., via the smart communication hub 200) at element 1006, representative of a confirmation that the vehicle has received the action data, to the network device (e.g., via the services hub 300). Furthermore, at element 1008, the machine-readable medium can receive, from second sensor (e.g., via the vehicle sensor manager 100) collision data representative of a collision of the vehicle.

Figure 11:
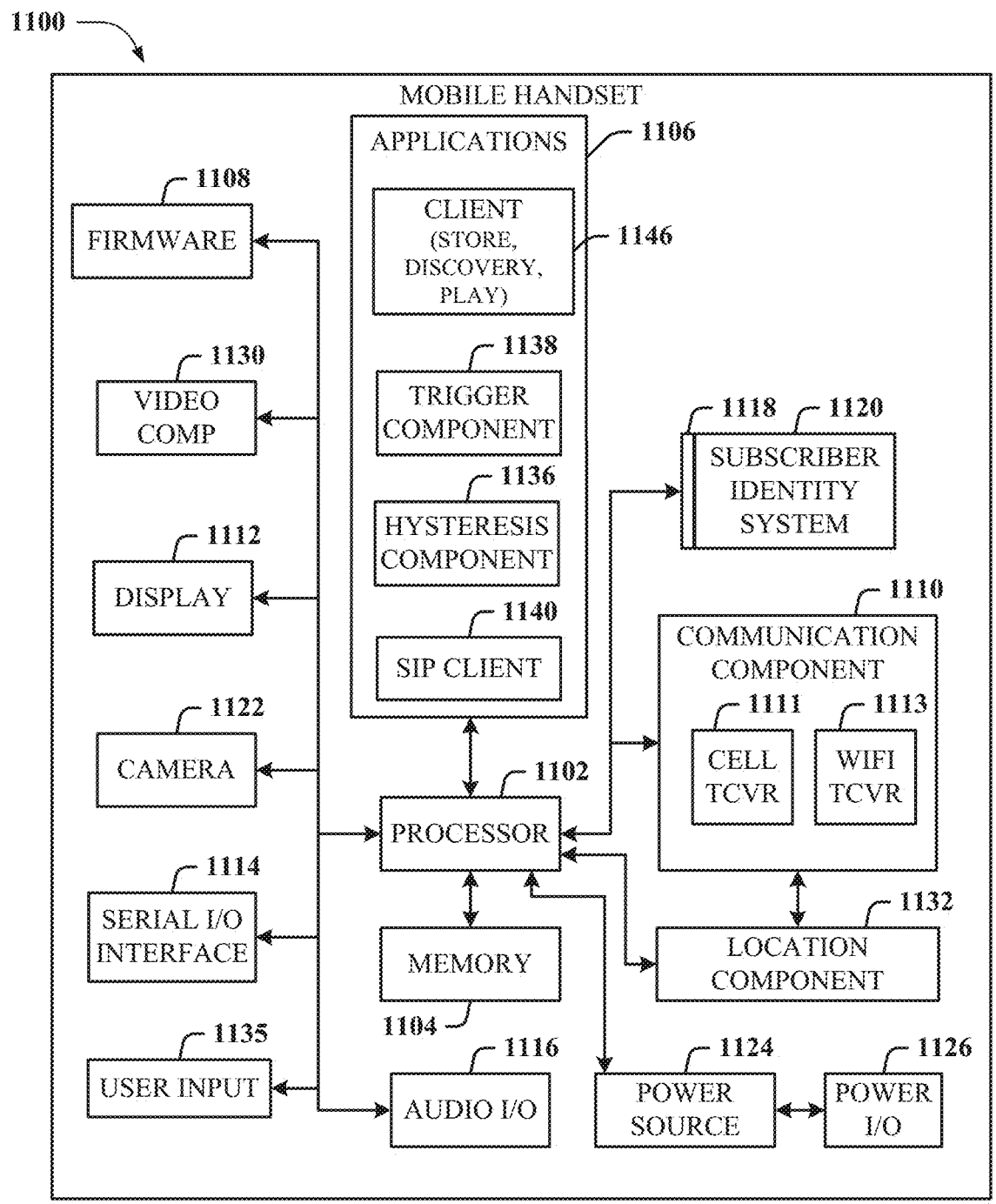
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
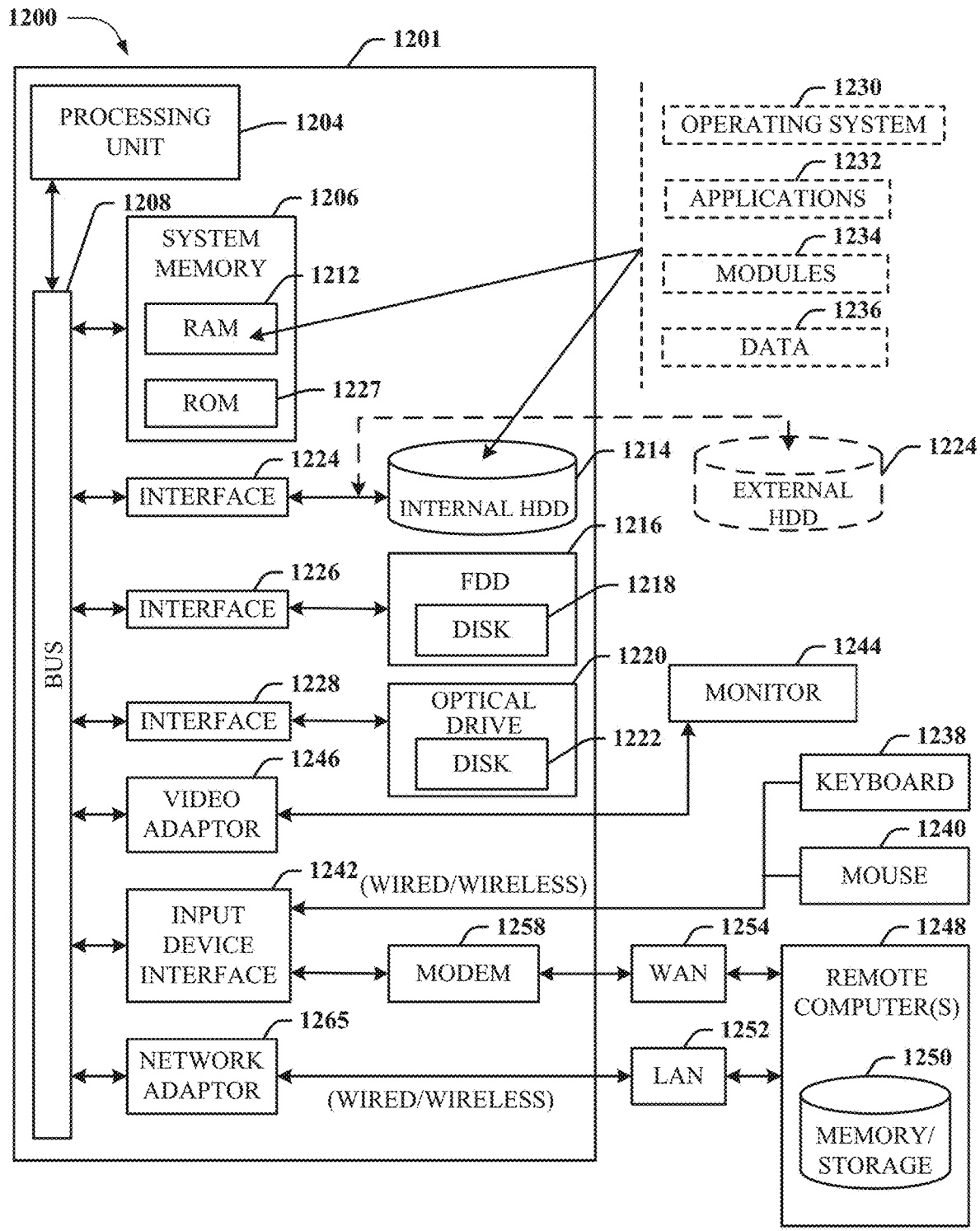
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/ storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Today there is no communication hub that registers, manages and governs driverless or self-driving vehicles. However, there will be a huge need for this in the future. Today, all the sensor data goes via eNodeB to the mobility data center, but there is no present solution to separate the sensor data flow from driverless cars. If there were such a technique, the separation would make it quicker to identify problems in driverless cars and issue alerts as well as make it easier to govern and manage non-compliance of policies when sensor data indicates there is a compromised sensor.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by first network equipment comprising a processor, sensor data representative of a sensor state of a sensor of a vehicle;
   based on the sensor data, receiving, from second network equipment by the first network equipment, action data representative of an action to be taken by the sensor;
   sending, by the first network equipment, the action data to the sensor to facilitate performance of the action by the sensor, wherein the action data comprises an emissions status request for emissions status data representative of an emissions status of the vehicle;
   in response to sending the action data to the sensor, receiving the emissions status data from the sensor;
   based on the emissions status being determined to be below a threshold value, facilitating issuing a registration for the vehicle; and
   based on fire data representative of a likelihood of the vehicle being on fire, facilitating, by the first network equipment, activating a video camera device that has a view of the vehicle.

2. The method of claim 1, wherein the video camera device is part of a smart city network of devices associated with a smart city.

3. The method of claim 1, wherein the action data is first action data, and further comprising:
   sending, by the first network equipment, second action data to the video camera device, wherein the second action data is configured to facilitate a zoom function of the video camera device.

4. The method of claim 1, wherein the action data is first action data, and further comprising:
   sending, by the first network equipment, second action data to the video camera device to facilitate a video recording.

5. The method of claim 1, wherein the sensor comprises a collision sensor for detection of a collision of the vehicle.

6. The method of claim 1, wherein the first network equipment is associated with a law enforcement identity, and wherein the action data further comprises directive data representative of an instruction to facilitate a movement of the vehicle according to a direction.

7. The method of claim 1, further comprising:
   sending, by the first network equipment, an indication that an emergency services entity has been notified via a device associated with the emergency services entity.

8. A system, comprising:
   a processor; and
   a memory that stores executable instructions that, when executed by the processor, facilitate performance of operations, comprising:
   receiving sensor data associated with a sensor of a vehicle;
   sending the sensor data to network equipment associated with a first entity;
   in response to sending the sensor data, receiving, from the network equipment, first action data representative of a first action to be sent to the sensor to perform the first action, wherein the first action is associated with determining an emissions status of the vehicle;

sending the first action data to the sensor;

in response to the sending of the first action data to the sensor, receiving the emissions status from the sensor;

based on the emissions status received from the sensor and a condition associated with a gas sensor being determined to have been satisfied, sending registration data representative a registration of the vehicle; and receiving, from a user equipment activation data to activate a video camera device that is capable of viewing the vehicle.

9. The system of claim 8, wherein the sensor data comprises an indication of a collision of the vehicle.

10. The system of claim 8, wherein the first entity is an emergency services entity, and wherein the operations further comprise:

receiving an indication that the emergency services entity has been notified via a device associated with the emergency services entity.

11. The system of claim 8, wherein the sensor data is sent to an insurance provider device associated with an insurance provider service.

12. The system of claim 8, wherein the sensor is a first sensor, and wherein the operations further comprise:

in response to receiving an indication of a collision, sending request data, representative of a request for a sensor status, to a second sensor of the vehicle.

13. The system of claim 8, wherein sending the registration data representative of the registration of the vehicle is further based on route data being determined to have satisfied the condition.

14. The system of claim 8, wherein the operations further comprise:

receiving sensor state data associated with the gas sensor; and in response to receiving the sensor state data and based on the sensor state data, sending notification data to the network equipment associated with the first entity.

15. A non-transitory machine-readable medium, comprising executable instructions that, when executed by a processor, facilitate performance of operations, comprising:

receiving sensor data originating from a sensor of a vehicle associated with a first identity;

based on the sensor data, sending action data, comprising data representative of an action to be taken by the sensor of the vehicle, to the sensor of the vehicle to facilitate the action being taken by the vehicle, wherein the action data comprises emissions request data representative of an emissions status of the vehicle;

in response to sending the action data to the sensor, receiving emissions data and gas data from the sensor;

based on the emissions status of the emissions data and the gas data, issuing a vehicle registration to be associated with the vehicle; and based on an output of a fire sensor being determined to have satisfied a condition associated with an impending fire, activating a video camera device that has a field of view that encompasses the vehicle.

16. The non-transitory machine-readable medium of claim 15, wherein the operations further comprise:

sending the action data to equipment associated with a second identity.

17. The non-transitory machine-readable medium of claim 16, wherein the action data further comprises route data to facilitate altering a first route of the vehicle to reduce traffic conditions for a second route determined to be related to a path of travel of an emergency services vehicle.

18. The non-transitory machine-readable medium of claim 15, wherein the action data further comprises a brake instruction to increase a brake pressure.

19. The non-transitory machine-readable medium of claim 15, wherein the sensor data comprises brake data representative of a brake pressure applied to a brake of the vehicle.

20. The non-transitory machine-readable medium of claim 15, wherein the sensor is a first sensor, and wherein the operations further comprise:

receiving, from a second sensor, collision data representative of information collected with respect to a collision of the vehicle.

* * * * *